US012746841B2

(12) United States Patent
Harper

(10) Patent No.: US 12,746,841 B2
(45) Date of Patent: Sep. 29, 2026

(54) VEHICLE CHARGING SYSTEM COMPATIBLE WITH MULTIPLE CHARGING PROTOCOLS AND METHOD

(71) Applicant: UCHICAGO ARGONNE, LLC, Chicago, IL (US)

(72) Inventor: Jason D. Harper, Monticello, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 811 days.

(21) Appl. No.: 18/127,120

(22) Filed: Mar. 28, 2023

(65) Prior Publication Data

US 2024/0326626 A1 Oct. 3, 2024

(51) Int. Cl.
*B60L 53/66* (2019.01)
*B60L 53/16* (2019.01)
(Continued)

(52) U.S. Cl.
CPC ............... *B60L 53/66* (2019.02); *B60L 53/16* (2019.02); *B60L 53/305* (2019.02); *B60L 53/62* (2019.02);
(Continued)

(58) Field of Classification Search
CPC ........ B60L 53/305; B60L 53/66; B60L 53/16; B60L 53/62
(Continued)

(56) References Cited

U.S. PATENT DOCUMENTS 8,937,455 B2 * 1/2015 Mitsutani ............... B60K 6/365 320/109
9,114,716 B2 * 8/2015 Loftus ..................... B60L 58/22
(Continued)

FOREIGN PATENT DOCUMENTS

KR 20200000960 A * 1/2020 ............ H04L 63/18

OTHER PUBLICATIONS

"Hitting on All Cylinders in the Electric Automobile: How Tesla's Model 3 Changed the Game," Jack Rickard, Published Online Apr. 9, 2016, Accessed Online Jan. 10, 2026, https://www.evtv.me/stories/hitting-on-all-cylinders-in-the-electric-automobile3893 (Year: 2016).*
(Continued)

*Primary Examiner* — John T Trischler
(74) *Attorney, Agent, or Firm* — Foley & Lardner LLP

(57) ABSTRACT

A electric vehicle service equipment (EVSE) system includes an EVSE connector and charge control module (CCM). The CCM performs a method for determining an operative charging protocol for an EVSE charge session. The method includes monitoring for a signal indicating that a control pilot pin is in a connected state, activating a signal through the control pilot pin in response to detecting the connected state, initiating a charging protocol inquiry function, and terminating the charging protocol inquiry function. A method for providing an EVSE charge session interoperable with multiple charging protocols which includes detecting that an EVSE connector is in a connected state, determining an operative charging protocol for the EVSE charge session, sending digital communications through the EVSE connector, determining at least one charging parameter, beginning a charging state corresponding to the operative charging protocol; and terminating the EVSE charge session based on the at least one charging parameter.

13 Claims, 3 Drawing Sheets

(51) Int. Cl.
*B60L 53/30* (2019.01)
*B60L 53/62* (2019.01)
*B60L 53/65* (2019.01)

(52) U.S. Cl.
CPC ................ *B60L 53/65* (2019.02); *Y02T 90/16* (2013.01); *Y04S 30/14* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 9,196,930 | B2 * | 11/2015 | Chorian | H01M 50/581 |
| 9,308,825 | B2 * | 4/2016 | Hayashigawa | B60L 53/16 |
| 9,348,381 | B2 * | 5/2016 | Khoo | G06Q 20/24 |
| 9,758,046 | B2 * | 9/2017 | Harper | B60L 53/64 |
| 9,787,112 | B2 * | 10/2017 | Sukup | H02J 7/00 |
| 9,796,285 | B2 * | 10/2017 | Lee | B60L 53/14 |
| 9,895,986 | B2 * | 2/2018 | Masuda | B60L 53/14 |
| 10,101,397 | B2 * | 10/2018 | Cooley | B60L 15/2045 |
| 10,131,241 | B2 * | 11/2018 | Lee | B60L 53/66 |
| 10,169,783 | B2 * | 1/2019 | Khoo | H04W 4/023 |
| 10,173,537 | B2 * | 1/2019 | Herzog | B60L 53/30 |
| 10,185,977 | B2 * | 1/2019 | Khoo | H04L 25/20 |
| 10,185,978 | B2 * | 1/2019 | Khoo | H04W 4/023 |
| 10,192,245 | B2 * | 1/2019 | Khoo | G01C 21/3476 |
| 10,210,552 | B2 * | 2/2019 | Khoo | G06Q 10/02 |
| 10,230,198 | B2 * | 3/2019 | Jefferies | B60L 53/64 |
| 10,586,258 | B2 * | 3/2020 | Khoo | H04L 25/20 |
| 10,773,605 | B2 * | 9/2020 | Lee | B60L 53/63 |
| 10,787,087 | B2 * | 9/2020 | Connolly | B60L 3/0023 |
| 10,839,433 | B2 * | 11/2020 | Khoo | B60L 53/66 |
| 10,846,763 | B2 * | 11/2020 | Khoo | B60L 53/305 |
| 10,861,066 | B2 * | 12/2020 | Khoo | G07F 15/005 |
| 10,872,361 | B2 * | 12/2020 | Khoo | B60L 53/305 |
| 10,882,415 | B2 * | 1/2021 | Hooker | B60L 53/16 |
| 11,040,607 | B2 * | 6/2021 | McGrew, Jr. | B60L 5/12 |
| 11,193,562 | B1 * | 12/2021 | McGrew, Jr. | B60K 17/02 |
| 11,292,351 | B2 * | 4/2022 | Dow | H02J 7/04 |
| 11,331,991 | B2 * | 5/2022 | McGrew, Jr. | B60K 17/06 |
| 11,421,759 | B2 * | 8/2022 | McGrew, Jr. | B60K 1/02 |
| 11,498,403 | B2 * | 11/2022 | McGrew, Jr. | B60K 17/04 |
| 11,552,486 | B2 * | 1/2023 | Sun | H02J 7/007188 |
| 11,572,933 | B2 * | 2/2023 | McGrew, Jr. | F16H 3/724 |
| 11,600,996 | B2 * | 3/2023 | Stanfield | B60L 53/18 |
| 11,715,136 | B2 * | 8/2023 | Khoo | H04W 4/023<br>700/286 |
| 11,715,138 | B2 * | 8/2023 | Khoo | B60L 53/65<br>700/286 |
| 11,727,106 | B2 * | 8/2023 | Shin | B60L 53/66<br>713/168 |
| 11,748,788 | B2 * | 9/2023 | Khoo | G06Q 10/1093<br>700/286 |
| 11,756,086 | B2 * | 9/2023 | Khoo | G06Q 20/409<br>700/286 |
| 11,756,087 | B2 * | 9/2023 | Khoo | G06F 1/26<br>700/286 |
| 11,796,038 | B2 * | 10/2023 | McGrew, Jr. | F16H 3/725 |
| 11,802,919 | B2 * | 10/2023 | Underhill | B60L 53/68 |
| 11,807,128 | B2 * | 11/2023 | Spina | H02J 7/00032 |
| 11,840,134 | B2 * | 12/2023 | McGrew, Jr. | B60K 17/06 |
| 12,005,801 | B2 * | 6/2024 | Jefferies | B60L 58/15 |
| 12,024,028 | B2 * | 7/2024 | Maury | G06F 16/21 |
| 12,040,907 | B2 * | 7/2024 | Raaijmakers | H04L 12/10 |
| 12,085,155 | B2 * | 9/2024 | McGrew, Jr. | F16H 3/66 |
| 12,157,382 | B2 * | 12/2024 | Dow | B60L 53/22 |
| 12,175,506 | B2 * | 12/2024 | Khoo | H04W 4/40 |
| 12,190,360 | B2 * | 1/2025 | Khoo | H04W 4/023 |
| 12,214,691 | B2 * | 2/2025 | Daniel | B60L 53/63 |
| 12,240,307 | B2 * | 3/2025 | McGrew, Jr. | F16H 3/64 |
| 12,288,267 | B2 * | 4/2025 | Dobrzynski | G06Q 40/04 |
| 12,328,018 | B2 * | 6/2025 | Stanfield | B60L 53/51 |
| 12,410,849 | B2 * | 9/2025 | McGrew, Jr. | B60K 1/02 |
| 12,508,938 | B2 * | 12/2025 | Verheijen | B60L 53/63 |
| 2002/0171291 | A1 * | 11/2002 | Wayne | B60Q 1/143<br>307/9.1 |
| 2009/0021871 | A1 * | 1/2009 | Moran | B60K 6/28<br>361/86 |
| 2011/0127956 | A1 * | 6/2011 | Mitsutani | H01M 10/44<br>320/109 |
| 2012/0086396 | A1 | 4/2012 | Pan et al. | |
| 2012/0242144 | A1 * | 9/2012 | Chorian | H01M 50/583<br>429/62 |
| 2013/0110296 | A1 * | 5/2013 | Khoo | B60L 53/64<br>700/286 |
| 2013/0119920 | A1 | 5/2013 | Hsu et al. | |
| 2013/0346010 | A1 * | 12/2013 | Schulz | B60L 53/14<br>324/602 |
| 2013/0346025 | A1 * | 12/2013 | Schulz | B60L 53/60<br>702/182 |
| 2014/0035527 | A1 * | 2/2014 | Hayashigawa | B60L 3/04<br>320/109 |
| 2014/0184141 | A1 * | 7/2014 | Loftus | B60L 3/00<br>320/104 |
| 2014/0207397 | A1 * | 7/2014 | Cooley | B60L 53/68<br>702/60 |
| 2015/0115873 | A1 * | 4/2015 | Lee | B60L 53/14<br>320/107 |
| 2016/0036256 | A1 * | 2/2016 | Sukup | H02J 7/00<br>320/107 |
| 2016/0039298 | A1 * | 2/2016 | Herzog | B60L 50/16<br>320/109 |
| 2016/0144728 | A1 * | 5/2016 | Harper | B60L 53/67<br>320/109 |
| 2016/0325635 | A1 * | 11/2016 | Masuda | B60L 53/66 |
| 2016/0339792 | A1 * | 11/2016 | Khoo | G06F 1/26 |
| 2016/0339793 | A1 * | 11/2016 | Khoo | G06Q 20/24 |
| 2016/0347191 | A1 * | 12/2016 | Hayashigawa | B60L 53/65 |
| 2016/0362016 | A1 * | 12/2016 | Khoo | B60L 53/63 |
| 2016/0364658 | A1 * | 12/2016 | Khoo | G06Q 20/409 |
| 2016/0364776 | A1 * | 12/2016 | Khoo | B60L 53/665 |
| 2017/0113563 | A1 * | 4/2017 | Lee | B60L 53/11 |
| 2018/0086213 | A1 * | 3/2018 | Jefferies | H01R 31/065 |
| 2018/0170195 | A1 * | 6/2018 | Jefferies | H02J 7/0013 |
| 2019/0061548 | A1 * | 2/2019 | Lee | B60L 53/11 |
| 2019/0139107 | A1 * | 5/2019 | Khoo | G01C 21/3492 |
| 2019/0156382 | A1 * | 5/2019 | Khoo | G01C 21/3476 |
| 2019/0156383 | A1 * | 5/2019 | Khoo | G06Q 20/102 |
| 2019/0156384 | A1 * | 5/2019 | Khoo | B60L 53/31 |
| 2019/0168619 | A1 * | 6/2019 | Hooker | B60L 53/14 |
| 2019/0180336 | A1 * | 6/2019 | Khoo | H02J 7/0013 |
| 2019/0296565 | A1 * | 9/2019 | Connolly | H02H 5/04 |
| 2019/0351776 | A1 * | 11/2019 | Du | B60K 6/485 |
| 2020/0262303 | A1 * | 8/2020 | Dow | B60L 50/66 |
| 2020/0282859 | A1 * | 9/2020 | Shin | B60L 53/66 |
| 2020/0366104 | A1 * | 11/2020 | Stanfield | H02J 7/34 |
| 2021/0008968 | A1 * | 1/2021 | McGrew, Jr. | B60K 6/365 |
| 2021/0016675 | A1 * | 1/2021 | Jefferies | H02J 7/0013 |
| 2021/0073876 | A1 * | 3/2021 | Khoo | H04W 4/02 |
| 2021/0090139 | A1 * | 3/2021 | Khoo | B60L 53/63 |
| 2021/0090140 | A1 * | 3/2021 | Khoo | G06Q 20/102 |
| 2021/0090141 | A1 * | 3/2021 | Khoo | B60L 53/65 |
| 2021/0110446 | A1 * | 4/2021 | Khoo | G01C 21/3476 |
| 2021/0188066 | A1 * | 6/2021 | McGrew | B60K 1/02 |
| 2021/0221247 | A1 * | 7/2021 | Daniel | H02J 3/144 |
| 2021/0309089 | A1 * | 10/2021 | McGrew, Jr. | F16H 37/046 |
| 2021/0342958 | A1 * | 11/2021 | Dobrzynski | G06Q 30/08 |
| 2021/0372505 | A1 * | 12/2021 | McGrew, Jr. | B60K 17/02 |
| 2021/0372506 | A1 * | 12/2021 | McGrew, Jr. | B60K 1/02 |
| 2021/0385095 | A1 * | 12/2021 | Raaijmakers | H02J 7/0045 |
| 2022/0029434 | A1 * | 1/2022 | Sun | B60L 53/16 |
| 2022/0072962 | A1 * | 3/2022 | Maury | B60L 7/10 |
| 2022/0090654 | A1 * | 3/2022 | McGrew, Jr. | F16H 3/724 |
| 2022/0115877 | A1 * | 4/2022 | Stanfield | B60L 53/51 |
| 2022/0163603 | A1 * | 5/2022 | Underhill | B60L 53/62 |
| 2022/0203853 | A1 * | 6/2022 | Dow | H02J 7/04 |
| 2022/0258583 | A1 * | 8/2022 | McGrew, Jr. | B60K 17/08 |
| 2022/0332201 | A1 * | 10/2022 | Khamashta | B60L 53/14 |
| 2022/0364630 | A1 * | 11/2022 | McGrew, Jr. | F16H 3/725 |
| 2022/0396168 | A1 * | 12/2022 | Jefferies | H02J 7/0013 |

(56) References Cited

U.S. PATENT DOCUMENTS

| | | | | |
|---|---|---|---|---|
| 2023/0122692 | A1* | 4/2023 | Spina | B60L 53/66 320/109 |
| 2023/0347782 | A1* | 11/2023 | Verheijen | B60L 53/63 |
| 2023/0365007 | A1* | 11/2023 | Shin | B60L 53/66 |
| 2023/0398894 | A1* | 12/2023 | Li | B60L 58/10 |
| 2023/0401613 | A1* | 12/2023 | Khoo | G07F 15/005 |
| 2023/0410162 | A1* | 12/2023 | Khoo | B60L 53/31 |
| 2024/0019016 | A1* | 1/2024 | McGrew, Jr. | B60K 1/02 |
| 2024/0072496 | A1* | 2/2024 | Nugent, Jr. | H01R 13/7132 |
| 2024/0075797 | A1* | 3/2024 | McGrew, Jr. | B60K 17/08 |
| 2024/0083289 | A1* | 3/2024 | Bennett | B60L 53/305 |
| 2024/0140220 | A1* | 5/2024 | Kiko | B60L 53/18 |
| 2024/0246430 | A1* | 7/2024 | Chavez, Jr. | B60L 53/16 |
| 2024/0308363 | A1* | 9/2024 | Khamashta | B60L 53/66 |
| 2024/0351464 | A1* | 10/2024 | Kubo | B60L 53/36 |
| 2024/0418245 | A1* | 12/2024 | McGrew, Jr. | F16H 3/725 |
| 2025/0112475 | A1* | 4/2025 | Malik | B60L 53/60 |
| 2025/0112476 | A1* | 4/2025 | Malik | H01R 13/6397 |
| 2025/0124479 | A1* | 4/2025 | Khoo | G06Q 20/102 |
| 2025/0156913 | A1* | 5/2025 | Khoo | B60L 53/14 |
| 2025/0156914 | A1* | 5/2025 | Khoo | B60L 53/14 |
| 2025/0183677 | A1* | 6/2025 | Malik | B60L 53/67 |
| 2025/0252513 | A1* | 8/2025 | Dobrzynski | G06Q 30/0234 |
| 2025/0253677 | A1* | 8/2025 | Stanfield | B60L 53/18 |
| 2025/0319791 | A1* | 10/2025 | Daniel | B60L 53/67 |
| 2025/0361924 | A1* | 11/2025 | McGrew, Jr. | F16H 3/66 |
| 2026/0084576 | A1* | 3/2026 | Verheijen | B60L 53/63 |

OTHER PUBLICATIONS

"Tesla Tap versus a Lectron Tesla to J1772 (48A) Adapter," MachLee, MacheForum, Published Online Apr. 14, 2022, Accessed Online Jan. 10, 2026, https://www.macheforum.com/site/threads/ tesla-tap-versus-a-lectron-tesla-to-j1772-48a-adapter.16492/page-3 (Year: 2022).*

"How to use PowerFlex Charging stations at NREL," National Renewable Energy Laboratory, retrieved from https://www.nrel.gov/about/assets/pdfs/powerflex-charging-station-instructions.pdf on Nov. 15, 2022, 4 pages (n.d.).

Agarwal, "Charge More EVs with Power Management," ChargePoint, retrieved from https://www.chargepoint.com/blog/charge-more-evs-power-management on Nov. 15, 2022, 8 pages (2017).

Wu, et al., "A Cloud-Based Simulation and Testing Framework for Large-Scale EV Charging Energy Management and Charging Control," SAE International Journal of Advances and Current Practices in Mobility 4(5), pp. 1492-1500 (2022).

* cited by examiner

VEHICLE CHARGING SYSTEM COMPATIBLE WITH MULTIPLE CHARGING PROTOCOLS AND METHOD

GOVERNMENT SUPPORT CLAUSE

This invention was made with government support under Contract No. DE-ACO2-06CH11357 awarded by the United States Department of Energy to UChicago Argonne, LLC, operator of Argonne National Laboratory. The government has certain rights in the invention.

BACKGROUND

The present disclosure relates generally to the field of charging electric vehicles.

BACKGROUND

Electric vehicles (EVs) are a class of vehicles which use a rechargeable battery/power bank and an on-board charger to drive the vehicle's power train. EVs may include plug-in electric vehicles (PEVs), battery electric vehicles (BEVs), plug-in hybrid electric vehicles (PHEVs), etc. EVs have become increasingly common in the consumer market as the desirability of vehicles using petroleum and non-renewable-based fuels has fallen. As a result, charging plazas, stations, and equipment have been developed to power and recharge the increasingly large fleet of EVs. Generally, such charging stations and equipment used to recharge an EV are referred to as Electric Vehicle Supply Equipment (EVSE). The growth of the EV market has resulted in multiple branches of EV models that lack common communication and charging protocols. Indeed, various international charging standards as well as independent proprietary standards have developed for both alternating current (AC) and direct current (DC) EV charging. EVs generally operate according to the charging protocol of a single standard and include—at best-limited ability to interface with EVSEs that charge according to a non-matching charging protocol. As a result, EVSEs are often tailored to a specific subset of EVs that are compatible with only a single or limited number of charging or communication protocols. No EVSE currently available is interoperable with each developed EV charging protocol. Accordingly, EV owners may find it difficult to locate an EVSE that provides the particular charging protocol required by their EV. Additionally, those EVSEs that contain advanced charging functionalities (e.g., smart charging, charge scheduling, etc.) may only be able to provide such services to a small subset of EVs based on the type of charging protocol the EVSE is configured to service.

SUMMARY

Arrangements described herein relate generally to systems and methods for a single EVSE to provide EV charging interoperable with multiple charging protocols and, in particular, to detecting connection to an EV, determining which charging protocol the connected EV is utilizing, sending digital communications to the EV via the matching charging protocol, optionally communicating with a charge station management system (CSMS) to negotiate smart charging, charge scheduling, etc., determining at least one charging parameter, and initiating a charging session with the EV until the charging parameter is satisfied.

In some arrangements, a method of determining the operative charging protocol of a connected EV is disclosed which includes monitoring a control pilot pin for signal indicative of an EV connection, determining whether a connection has been established to the control pilot pin, activating a signal indicating that the EVSE is capable of digital communication, beginning a charging protocol inquiry function by listening for packets and setting an expiration timer, and determining the operative charging protocol of a connected EV based on at least one signal received from the EV or based on the timeout of the expiration timer.

In other arrangements, an EVSE system for providing a charging session interoperable with any connected EV regardless of the connected EV's operative charging protocol is disclosed. Particularly, the EVSE system may monitor for a signal indicative that an EV has connected, detect that connection to an EV has occurred, determine the connected EV's operative charging protocol, communicate digitally to the EV, receive signals from the EV indicative of charging information, determine a charging parameter of the EV, and provide electric power to the EV until the charging parameter is satisfied.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
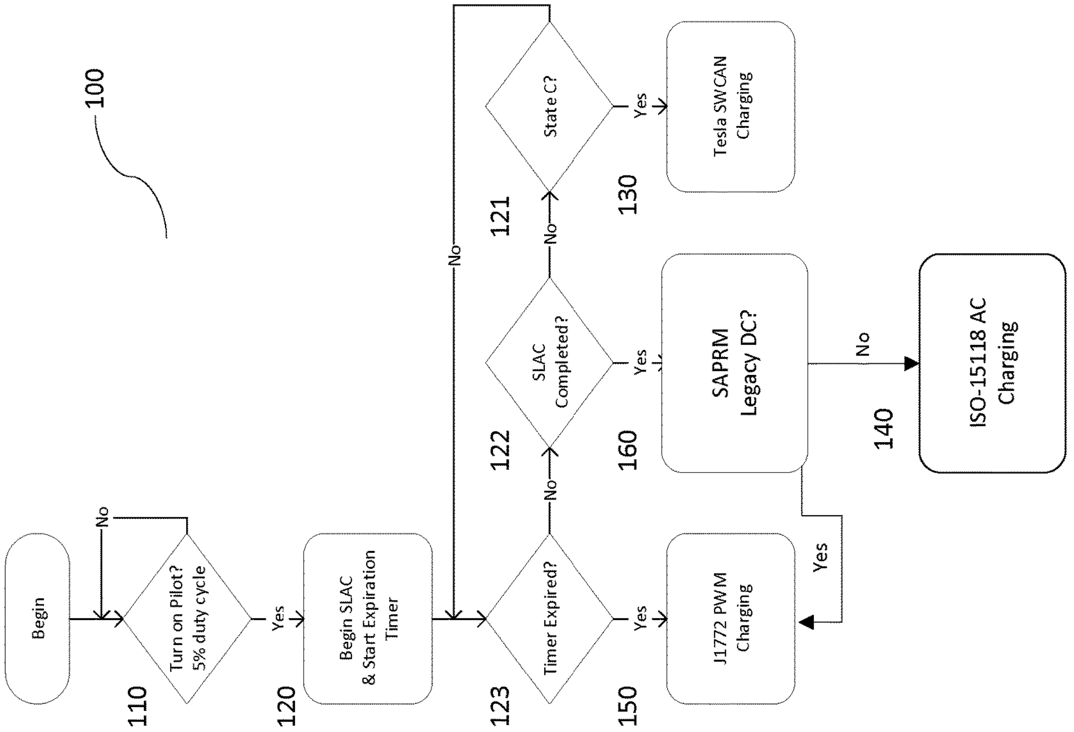
FIG. 1 is a schematic flow diagram depicting a method of determining the operative charging protocol for a connected EV.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Arrangements herein relate generally to systems and methods for providing an EV charging session interoperable with multiple charging protocols by a single EVSE and, in particular, to monitoring for a connection to an EV, detecting that an EV has connected, activating signals indicative of digital communication capacity to an EV, determining which charging protocol the connected EV is utilizing based on received signals, communicating digitally with the connected EV, optionally communicating with a CSMS to negotiate smart charging, charge scheduling, etc., determining at least one charging parameter, interfacing with the EV via the matching charging protocol, and completing a charging session with the EV based on the charging parameter. A method of providing interoperable charging may be performed by an EVSE system utilizing at least a charge control module (CCM) that determines a corresponding connected charging protocol of the connected EV. In response to initiating a charge connection between the EVSE and the EV, the charge control module (CCM) may communicate with the EV, receive signals from the EV, determine the EVs operative charging protocol, determine a charging parameter, begin a charging state corresponding to the determined charging protocol, then terminate the charging session after satisfying the charging parameter.

Generally, EV drivers seek out EVSEs capable of interacting with the specific charging protocol of their EV. Given the variety of charging protocols and the lack of interoperability between EVs using one charging protocol and EVSEs configured to charge according to a different protocol, EV drivers may experience difficulty finding charging stations or be required to charge their vehicle at EVSEs that perform sub-optimal modes of charging. Additionally, EVSEs may utilize a CSMS to provide charging operation management, billing management, vehicle-to-grid energy management, EV fleet management, etc. However, the efficiency and scope of CSMSs may be limited if the EVSEs serviced only interoperate with a limited number of EV charging protocols.

Providing an EVSE interoperable with a wide range of charging protocols, capable of determining the operative protocol of a connected EV, and capable of varying a charging session based on the type of EV connected would benefit both EV drivers, EVSE premises owners, and grid utility providers. EV drivers could utilize such an EVSE regardless of the charging protocol of their EV, EVSE premises owners could manage and service a wider fleet of EVs, and grid operators could acquire data useful for running smart charging or charge scheduling systems from a wider base of EVs.

Variations of the systems and methods described herein provide an EVSE system and a method of providing a charging session interoperable with multiple charging protocols such that one EVSE may operate compatibly with any connected EV-regardless of the connected EV's particular operative charging protocol.

FIG. 1 shows a flow diagram of a method 100 of determining the operative charging protocol of a connected EV. The method may be performed, for example, by a CCM. The method includes determining whether a connection has been established to a control pilot pin 110. The CCM may default to a baseline signal (e.g., a 12V DC signal on the control pilot pin) utilized to monitor the EVSE connector for an indication that an EV is connected. If the CCM default baseline signal remains unchanged, the CCM maintains the default baseline signal. When the EVSE connector is plugged into an EV, the CCM may detect a drop or change in the default baseline signal (e.g., the 12V DC signal on the control pilot pin dropping to a 9V DC signal (i.e., State B1)). The CCM may determine that the registered drop or change in the default baseline signal is the result of a connection to an EV circuit. Upon detecting the drop or change in the default baseline signal, the CCM may activate a signal (e.g., a pulse width modulated square wave (PWM)) to be sent through the control pilot pin. For example, the CCM may generate the signal by activating a PWM circuit set to a 5% duty cycle. In other embodiments, the CCM may generate a signal by activating a PWM circuit set to a duty cycle between 4.5%-5.5%. By activating a PWM signal with a duty cycle of about 5%, the CCM communicates to a connected EV that the EVSE is capable of digital communication.

The method also includes running a charging protocol inquiry function 120. While the CCM is running the charging protocol inquiry function 120, the CCM may begin listening for Signal Level Attenuation Characterization (SLAC) messages. The CCM may also set a SLAC Expiration Timer, for example, for a length of time (e.g., 20 seconds, 40 seconds, 60 seconds, etc.). While running the charging protocol inquiry function 120, the CCM may make multiple determinations.

The CCM may determine that the connected EV's operative charging protocol is a Tesla SAE J2411 Single Wire CAN Network for Vehicle Applications (SWCAN) protocol. For example, the CCM may detect a change in voltage or signal indicative that the control pilot pin is operating on State C at a 5% duty cycle before completing SLAC 121. For example, the CCM may determine that the control pilot pin is not operating at 12 Volts but is instead operating at 6 Volts at a duty cycle between 4.5% and 5.5%. Rather than receive any PLC SLAC messages, activating a PWM signal around 5% (e.g., between 4.5% and 5.5%) may instantly or rapidly (e.g., within seconds) result in the CCM detecting State C. Upon receiving such a signal indicative that the control pilot pin is operating on State C, the CCM may determine that the connected EV's operative charging protocol is Tesla SWCAN charging 130. The CCM may then terminate the method for determining the operative charging protocol 100 and begin an EVSE charging state appropriate for SWCAN charging.

The CCM may also determine that the connected EV's operative charging protocol is a ISO-15118 AC protocol 140. For example, while listening for SLAC messages, the CCM may receive a number of sounding packets from the connected EV using power line communication (e.g., HomePlug Green PHY (HPGP)). The CCM may calculate the average signal power of the sounding packets and send back that information to the connected EV. The CCM may then determine that the process of listening for SLAC messages has completed once a logical network is established with the EV 122. The CCM and EV then negotiate what protocol will be utilized for the charging session. The CCM will receive a Supported App Protocol Request Message (SAPRM) from the EV. The CCM may determine from the SAPRM 160 that the connected EV supports the ISO-15118 AC charging protocol (e.g., ISO-15118-2, ISO-15118-3, ISO-15118-5, ISO-15118-4, ISO-15118-8, ISO-15118-9, ISO-15118-20, etc.). After determining from the SAPRM 160 that the connected EV supports ISO-15118 AC charging, the CCM determines that the operative charging protocol of the EV is a ISO-15118 AC protocol 140. The CCM may then terminate the method for determining the operative charging protocol 100 and begin an EVSE charging state appropriate for ISO-15118 AC charging.

The CCM may also determine that the connected EV's operative charging protocol is a J1772 protocol 150. For example, the CCM may receive no sounding packets while listening for SLAC messages. The SLAC expiration timer may expire, terminate, or reach a specified value (e.g., a time of 20 seconds) indicating that a sufficient amount of time has passed and no SLAC messages have been received. In some embodiments, the SLAC Expiration Timer may be a countdown timer, a timer that counts up to a target number, or other sufficient means of determining that the CCM is not participating with the connected EV in a SLAC messaging exchange. Upon determining that the SLAC Expiration Timer has expired or that any SLAC messaging exchange has timed out, the CCM may determine that the connected EV operates on a J1772 charging protocol. After making such a determination, the CCM may activate a PWM signal at a duty cycle between 10% and 96%, depending on the EVSE amperage rating, to indicate to the EV that the EVSE is operating on the J1772 charging protocol (e.g., indicating to the EV that the EVSE is a J1772 AC EVSE). The CCM may then terminate the method for determining the operative charging protocol 100 and begin an EVSE charging state appropriate for J1772 charging.

| The CCM may also determine from the SAPRM 160 that the connected EV's operative charging protocol is a legacy DC charging protocol (e.g., DIN 70121). For example, while listening for SLAC messages, the CCM may receive sounding packets from the connected EV using a power line communication (e.g., HPGP). The CCM may calculate the average signal power of the sounding packets and send back that information to the connected EV. The CCM may then determine that the process of listening for SLAC messages has completed once a logical network is established with the EV 122. The CCM and EV then negotiate what protocol will be utilized for the charging session. The CCM will receive a SAPRM from the EV. The CCM may determine from the SAPRM 160 that the connected EV only supports a legacy DC charging protocol. The CCM may then gather information (e.g., state of charge, EV Maximum Current Limit, EV Maximum Power Limit, EV Energy Capacity, EV Energy Request, etc.) from a signal (e.g., a Charge Parameter Discovery Request message) received by the CCM from the EV. The CCM may then utilize this information to engage in J1772 PWM charging with the connected EV (e.g., changing the duty cycle on the control pilot pin from a duty cycle of between 4.5% to 5.5% to a duty cycle of between 10% to 96%, depending on the amperage rating of the EVSE). In this way, the CCM indicates to the EV that the EVSE is operating as a J1772 AC EVSE. The CCM may then terminate the method for determining the operative charging protocol 100 begin an EVSE charging state appropriate for J1772 charging.

After determining the operative charging protocol for a connected EV, the EVSE and/or CCM may then digitally communicate to the connected EV by sending signals or queries for information. Such information obtained by the EVSE may include state of charge (SoC), estimated departure time, estimated miles to destination, maximum charging rate, maximum charging capacity, etc. As discussed below, the EVSE/CCM may then operate to provide a method of charging interoperable with multiple charging protocols such that the EVSE may compatibly charge the connected EV-regardless of its particular operative charging protocol.

Figure 2:
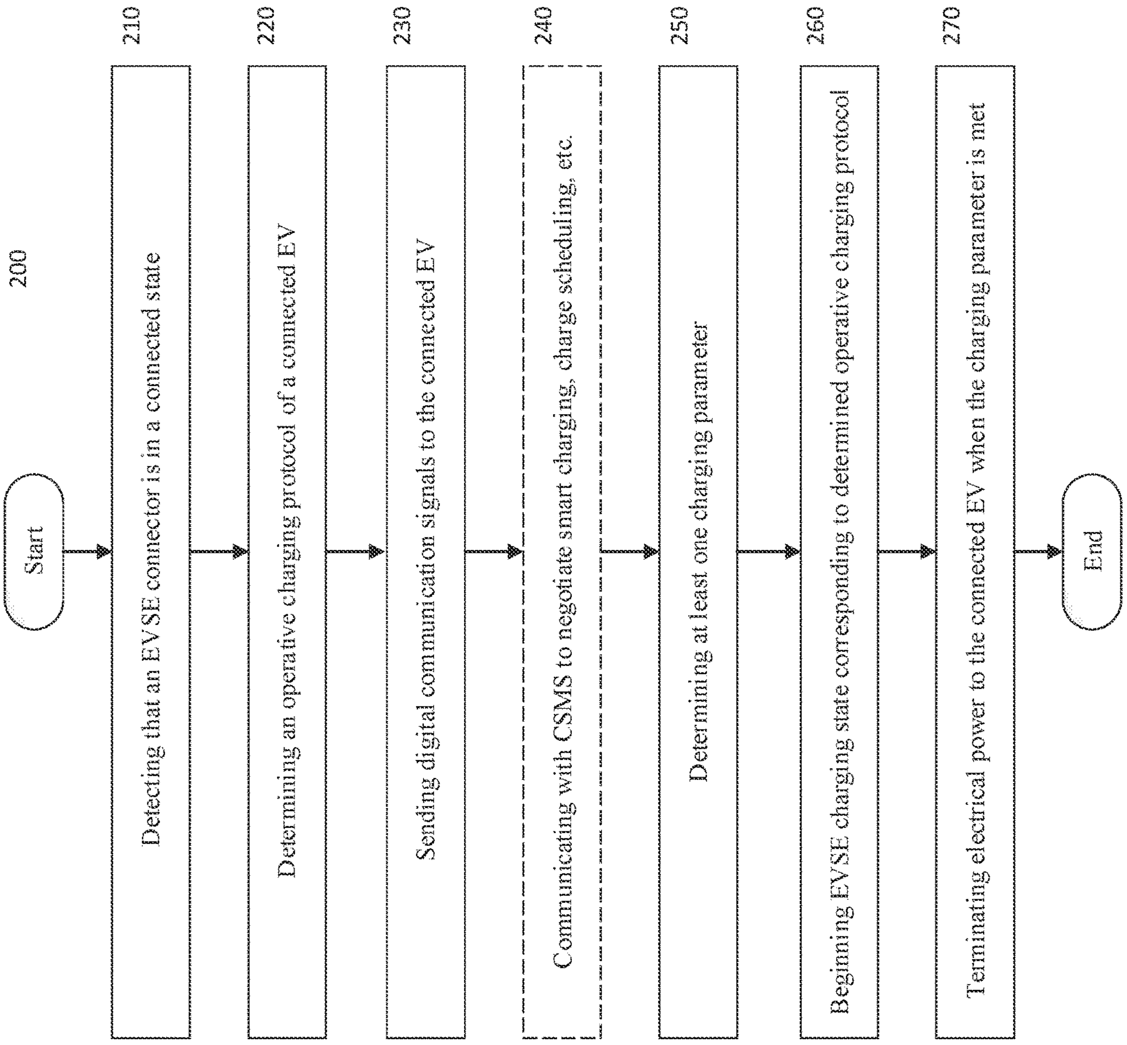
FIG. 2 is a schematic flow diagram depicting a method for providing, via a single EVSE, a charging session interoperable with multiple EV charging protocols.

FIG. 2 flow diagram depicting a method for providing, via a single EVSE, a charging session interoperable with multiple EV charging protocols 200. At the start of the method, the EVSE may be monitoring for a connection to an EV. For example, the EVSE may monitor a voltage across a set of leads or pins and remain in a standby phase until a change of voltage occurs. A change in voltage may occur when the EVSE connector attaches to a charging port of an EV.

The method 200 includes detecting that the EVSE has connected to a charging port of an EV 210. The EVSE may detect that the EVSE connector is coupled to an EV, for example, by registering a change of voltage across a set of leads or pins, by receiving a signal from an EV, etc. Upon determining that the EVSE connector is coupled to a connected EV, the EVSE may then activate an initial signal to the connected EV indicating that the EVSE is capable of digital communication. For example, the EVSC may activate a PWM signal with a duty cycle of 5%, or a PWM signal with a duty cycle between 4.5% and 5.5%. The EVSE may communicate such a signal to the connected EV via a control pilot pin linking a CCM to the EVSE connector.

The method 200 includes determining the operative charging protocol of the connected EV 220. The EVSE may determine the operative charging protocol of the connected EV by running a charging protocol inquiry function 120 at the CCM. As discussed above, the CCM may begin listening for SLAC messages and set a SLAC Expiration Timer and determine which charging protocol the connected EV is utilizing based on signals sent and data received from the connected EV. Such charging protocols may include Tesla SWCAN, ISO-15118, J1772, DIN 70121, etc.

The method 200 includes sending digital communication signals to the connected EV 230. Particularly, the EVSE may send digital communication signals according to the operative charging protocol of the connected EV. For example, in some arrangements, the EVSE may determine that the operative charging protocol is an ISO 15118 AC charging protocol. The EVSE may interface with the connected vehicle through Power Line Communication (PLC), particularly through a HPGP interface. The EVSE may then receive at least the following information from the connected EV depending on the EV's operative charging protocol: current state of charge, maximum/minimum charging limits (amps), desired energy (kWh), departure time (HH:MM:SS), miles to destination (mi), etc.

The method 240 also includes the optional step of communicating with a CSMS to negotiate smart charging, charge scheduling, etc. 240. In addition to sending communications to the connected EV, the EVSE may send communications to a CSMS (e.g., a server) operating on a network. For example, the EVSE may utilize Open Point Charge Protocol (OCPP) (e.g., OCPP 1.6J, OCPP 2.0.1, etc.). By receiving information from the connected EV via its operative charging protocol, the EVSE may provide such information to the CSMS, which may then consider the needs of the grid operator, building/home owner, premises manager, as well as the EV driver into consideration. The CCM may generate EV agents from the information received from the connected EV, if the EV itself does not support charge scheduling (e.g., EVs that do not support an ISO-15118 charging protocol). The EV agents may be used to operate on the connected EV's behalf and communicate the connected EV's need (requested power, departure time, desired charging rate, desired charging price, etc.) to the CSMS. Such EV agents could be generated in the EVSE, or alternatively, could be generated at a later point from the connected EV's information sent by the EVSE. Regardless of the connected EV's operative charging protocol, the EV agents may interact on the connected EV's behalf after the EVSE or other means (e.g., telematics) populates the EV agent with the data acquired from its communication with the connected EV. In other embodiments, a mobile application in communication with at least one of the CCM, the CSMS, or the EV may populate the EV agent with data to negotiate charge scheduling, facilitate smart charging, etc. The CSMS may then utilize a charge scheduler including a data stream of prospective time intervals and corresponding power available over the prospective time interval to prioritize and tailor power delivery to multiple EVSEs and their corresponding connected EVs.

The method 200 may also include determining at least one charging parameter corresponding to the connected EV 250. The charging parameter could include a charging status, charging rate, charging time, or other suitable charging parameters to define the bounds of a charging session.

The method 200 may also include beginning a charging state within the EVSE corresponding to the determined operative charging session of the connected EV. For example, if the EVSE determined that the operative charging protocol of the connected EV was J1772, the EVSE may begin activating a PWM signal at a 50% duty cycle, 40% duty cycle, 30% duty cycle, etc.

The method 200 may also include terminating electrical power to the connected EV when the charging parameter is met 270. For example, upon determining that a charging status is satisfied, a certain amount of power has been transferred, or a certain price has been reached, the EVSE may cease supplying power to the connected EV. The EVSE may then terminate the charging session and resume monitoring for a signal indicative of a connected EV.

Figure 3:
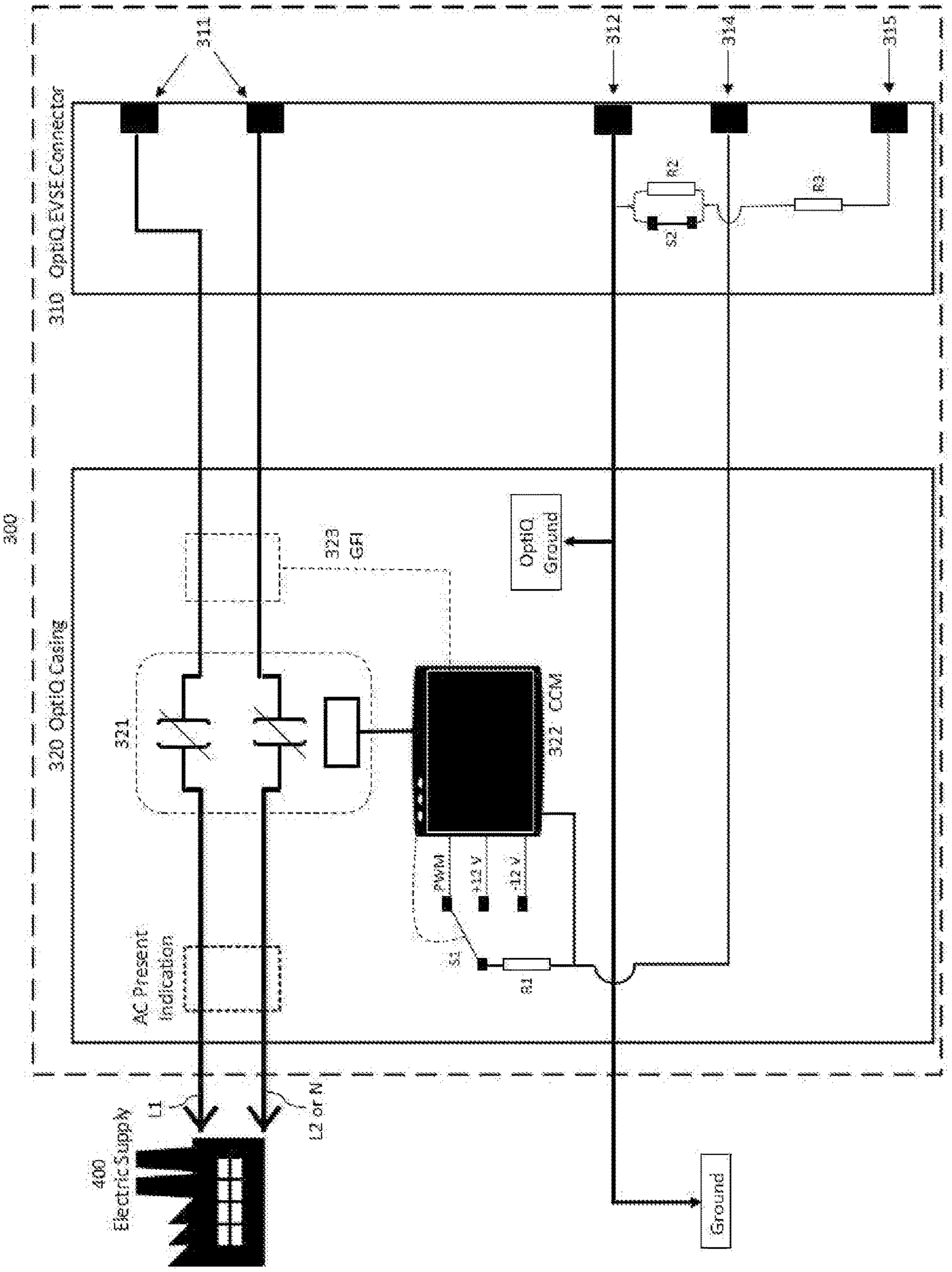
FIG. 3 is a schematic diagram of an example EVSE system capable of providing a charging session interoperable with multiple EV charging protocols by determining the operative charging protocol of a connected EV.

FIG. 3 shows a schematic diagram of an example EVSE system 300 capable of providing a charging session interoperable with multiple EV charging protocols by determining the operative charging protocol of a connected EV. The EVSE system 300 is configured to provide electric power to an EV following a determination of the operative charging protocol of the connected EV. In some embodiments, the EVSE system 300 may include a CSMS (not shown) and may communicate to the CSMS (e.g., via OCCP 1.6J, etc.).

The EVSE system 300 may include an EVSE connector 310 configured to couple to the charging port of an EV. For example, the EVSE connector 310 could include an SAE J1772™ male coupler, and IEC 62196-2 Type 1, IEC 62196-2 Type 2, IEC 62196-2 Type 3, GB/T Part 2, or other suitable couplers for AC charging (IEC 62196-3 CCS, SAE J1772™ CCS, GB/T Part 3, Tesla, etc.). The EVSE connector 310 may include AC conductors 311 configured to deliver AC power to an on-board charger or charge controller of the connected EV. The EVSE connector 310 may also include a ground wire 312 configured to provide a pathway from the circuit to ground. The EVSE connector may also include a control pilot pin 314. The control pilot pin 314 couples the EVSE system 300 to the charge controller of the connected EV. Specifically, the control pilot pin 314 may enable the EVSE system 300 to digitally communicate to the connected EV and receive signals from the connected EV containing data relevant to determining the operative charging protocol of the connected EV, engaging the connected EV in smart charging, or integrating the connected EV into a charge scheduler. The EVSE connector 310 may also include a proximity pilot 315. The proximity pilot 315 may send a signal from the EVSE system 300 to the connected EV's control system to prevent the vehicle from moving while connected to the EVSE system 300 and to control the coupling of the EVSE connector 310 to the connected EV.

The EVSE system 300 also includes an EVSE control box 320. The EVSE control box may be coupled to any a power source 400, for example, a power bank, power grid, or power generator suitable for providing electric power to supply the EVSE. For example, the power source 400 may include a 120 VAC, 208 VAC, 240 VAC, or 480 VAC 50/60 Hz single or three-phase power source. The connectors in the EVSE control box 320 coupled to the power source 400 may be coupled to a power connection assembly 321. The power connection assembly 321 may engage to complete a circuit to supply power from the power source 400, through the EVSE system 300, to the connected EV. The power connection assembly may also be disengaged to cease the supply of power from the power source 400 through the EVSE system 300, and to the connected EV.

The EVSE system 300 may also include a CCM 322. The CCM 322 may control the charging sessions for a connected EV, may monitor the EVSE connector 310 for a signal indicative of the connected EV, may determine the operative charging protocol of the connected EV, may communicate with a CSMS, may digitally communicate to the connected EV, may generate EV agents on behalf of the connected EV based on information received from the connected EV, may determine charging parameters, and may begin power transmission and terminate power transmission to the connected EV according to the determined charging parameters. The CCM 322 includes circuitry capable of performing the method 100 of determining the operative charging protocol of a connected EV described above.

The circuitry of the CCM 322 may include a processor. For example, the processor may be configured to execute instructions, for example, instructions stored on a memory (e.g., RAM, ROM, solid state drive) located within the CCM 322. The processor may also be configured to perform the determinations required to facilitate the method 200 described above. The CCM 322 may also contain a PLC adapter (e.g., a HPGP PLC adapter). The PLC adapter may allow the CCM to digitally communicate with a connected EV. In various embodiments, the CCM 332 includes a SWCAN transceiver to enable communications with Tesla EVs. The CCM 322 may also include a power source. The power source could include any rechargeable power source (e.g., a LI-ion or a Ni-Cad battery). The CCM 322 may also draw power from the power source 400.

The EVSE System 322 may also include a ground fault circuit interrupter (GFCI) 323. The GFCI may monitor the EVSE System 322 for a current leakage and upon detection, the power connection assembly 321 may disengage to disrupt the supply power from the power source 400, reducing the risk of electric shock.

It should be noted that the term "example" as used herein to describe various arrangements or arrangements is intended to indicate that such arrangements or arrangements are possible examples, representations, and/or illustrations of possible arrangements or arrangements (and such term is not intended to connote that such arrangements or arrangements are necessarily crucial, extraordinary, or superlative examples).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be configured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, and comparison steps.

While this specification contains many specific implementation details, these should not be construed as limitations on the scope of any arrangement or of what may be claimed, but rather as descriptions of features specific to particular implementations of particular arrangements. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for determining an operative protocol for an electrical vehicle supply equipment (EVSE) charge session, the method comprising:
- monitoring for an indication that a control pilot pin is in a connected state, the connected state indicative of an EVSE connector of the EVSE being connected with an electric vehicle (EV);
- activating a pulse width modulated square wave (PWM) signal through the control pilot pin in response to detecting the connected state to communicate capability of the EVSE to the EV;
- initiating a charging protocol inquiry function wherein digital information is received through the control pilot pin; and
- terminating the charging protocol inquiry function in response to determining expiration of an expiration timer, wherein a length of the expiration timer is between 20 to 60 seconds, inclusive.

2. The method of claim 1, wherein:
- initiating the charging protocol inquiry function includes:
  - listening for digital signals through the control pilot pin;
  - starting the expiration timer;
  - and
  - determining that the operative protocol is J1772 in response to the expiration timer ending.

3. The method of claim 2, wherein listening for digital signals includes: listening for a plurality of sounding packets, calculating an average signal power of the plurality of sounding packets, and sending the average signal power via a HomePlug GreenPHY protocol over the control pilot pin.

4. The method of claim 2, wherein the signal through the control pilot pin in response to detecting the connected state is a PWM signal with a duty cycle of 5%.

5. The method of claim 2, wherein the expiration timer is a Signal Level Attenuation Characterization (SLAC) Expiration Timer configured to timeout at a designated length of time of less than 60 seconds.

6. A method for providing interoperable charging via a single electrical vehicle supply equipment (EVSE), the method comprising:

detecting that an EVSE connector is in a connected state in response to the EVSE connector connecting to an electric vehicle (EV);

determining an operative protocol of the EV for an EVSE charge session based at least on initiation of a charging protocol inquiry function and communication of a capability of the EVSE to the EV by:

activating a pulse width modulated square wave (PWM) signal through a control pilot pin in response to detecting the connected state to communicate capability of the EVSE to the EV, initiating the charging protocol inquiry function wherein digital information is received through the control pilot pin, and terminating the charging protocol inquiry function in response to determining expiration of an expiration timer, wherein a length of the expiration timer is between 20 to 60 seconds, inclusive;

sending digital communications through the EVSE connector;

determining at least one charging parameter;

beginning a charging state corresponding to the operative protocol; and terminating the EVSE charge session based on the at least one charging parameter.

7. The method of claim 6, wherein:

initiating the charging protocol inquiry function includes:

listening for digital signals through the control pilot pin;

starting the expiration timer;

and determining that the operative protocol is J1772 in response to the expiration timer ending.

8. An electrical vehicle supply equipment (EVSE) system for providing a charging session interoperable with multiple electric vehicle charging protocols, the EVSE system comprising:

an EVSE control box coupled to a power source, the EVSE control box including:

a power connection assembly, a charge control module configured to determine and select an operative protocol for an EVSE charge session; and an EVSE connector, wherein the charge control module is further configured to:

monitor for an indication that a control pilot pin is in a connected state, the connected state indicative of an EVSE connector of the EVSE being connected with an electric vehicle (EV);

activate a pulse width modulated square wave (PWM) signal through the control pilot pin in response to detecting the connected state to communicate capability of the EVSE to the EV;

initiate a charging protocol inquiry function wherein digital information is received through the control pilot pin; and terminate the charging protocol inquiry function in response to determining expiration of an expiration timer, wherein a length of the expiration timer is between 20 to 60 seconds, inclusive.

9. The EVSE system of claim 8, wherein the charge control module is configured to determine and select the operative protocol comprising:

a J1772 alternating current (AC) protocol.

10. The EVSE system of claim 8, wherein:

initiating the charging protocol inquiry function includes:

listening for digital signals through the control pilot pin;

starting the expiration timer; and determining that the operative protocol is J1772 in response to the expiration timer ending.

11. The EVSE system of claim 10, wherein listening for digital signals includes: listening for a plurality of sounding packets, calculating an average signal power of the plurality of sounding packets, and sending the average signal power via a HomePlug GreenPHY protocol over the control pilot pin.

12. The EVSE system of claim 10, wherein the signal through the control pilot pin in response to detecting the connected state is a PWM signal with a duty cycle of 5%.

13. The EVSE system of claim 10, wherein the expiration timer is a Signal Level Attenuation Characterization (SLAC) Expiration Timer configured to timeout at a designated length of time of less than 60 seconds.

* * * * *